(12) United States Patent
Qiang et al.

(10) Patent No.: US 11,159,212 B2
(45) Date of Patent: Oct. 26, 2021

(54) METHOD AND NETWORK NODE FOR GENERATING AND SELECTING A CODEBOOK IN A MIMO COMMUNICATION NETWORK

(71) Applicant: TELEFONAKTIEBOLAGET LM ERICSSON (PUBL), Stockholm (SE)

(72) Inventors: Yongquan Qiang, Ottawa (CA); Hong Ren, Kanata (CA); Jianguo Long, Kanata (CA); Mats Åhlander, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/955,267

(22) PCT Filed: Dec. 20, 2017

(86) PCT No.: PCT/IB2017/058225
§ 371 (c)(1),
(2) Date: Jun. 18, 2020

(87) PCT Pub. No.: WO2019/122972
PCT Pub. Date: Jun. 27, 2019

(65) Prior Publication Data
US 2021/0194546 A1    Jun. 24, 2021

(51) Int. Cl.
*H04L 1/02* (2006.01)
*H04B 7/0456* (2017.01)
*H04B 7/0452* (2017.01)

(52) U.S. Cl.
CPC ......... *H04B 7/0456* (2013.01); *H04B 7/0452* (2013.01)

(58) Field of Classification Search
CPC ..... H04L 1/0618; H04L 1/06; H04L 25/0224; H04B 7/082; H04B 7/0452; H04B 7/0456;
(Continued)

(56) References Cited

U.S. PATENT DOCUMENTS

2009/0323849 A1  12/2009  Bala et al.
2017/0085350 A1*  3/2017  Kim ............... H04L 5/0023
(Continued)

FOREIGN PATENT DOCUMENTS

EP    2890177 A1    7/2015
WO   2014198037 A1  12/2014

OTHER PUBLICATIONS

International Search Report and Written Opinion issued on corresponding International PCT Application PCT/IB2017/058225.
(Continued)

*Primary Examiner* — Khai Tran
(74) *Attorney, Agent, or Firm* — Ericsson Inc.

(57) ABSTRACT

A method in a network node for Multiple Input Multiple Output (MIMO) is provided. The method comprises: obtaining a precoding matrix indicator (PMI) for a first codebook for use in a Single User Multiple Input Multiple Output (SU-MIMO) transmission; determining a precoding matrix for a second codebook, based on the obtained precoding matrix indicator; and selecting the determined precoding matrix for the second codebook in response to determining that an User Equipment (UE) is scheduled for a Multi-User (MU)-MIMO transmission. A network node for performing this method is also provided.

19 Claims, 11 Drawing Sheets

(58) Field of Classification Search
CPC ............... H04B 17/336; H04B 7/0639; H04W 72/1289; H04W 72/1284
USPC ................................................. 375/267, 260
See application file for complete search history.

(56) References Cited

U.S. PATENT DOCUMENTS

2020/0178092 A1\* 6/2020 Ren ........................ H04W 24/02
2021/0006316 A1\* 1/2021 Long .................... H04B 7/0632

OTHER PUBLICATIONS

3GPP TSG-RAN WG1#82, Title: FD-MIMO codebook structure, design features, and dimensioning, Source: Ericsson, R1-154557, Beijing, China, Aug. 24-28, 2015, pp. 1-8.

\* cited by examiner

METHOD AND NETWORK NODE FOR GENERATING AND SELECTING A CODEBOOK IN A MIMO COMMUNICATION NETWORK

TECHNICAL FIELD

The present description generally relates to generating and selecting a codebook for precoding data in a communication network.

BACKGROUND

Active antenna system (AAS) is one of the key technologies adopted by 4G Long Term Evolution (LTE) and 5G New Radio (NR) to enhance the wireless network performance and capacity by using Full Dimension Multiple Input Multiple Output (FD-MIMO) and massive MIMO. A typical AAS system consists of two-dimensional antenna elements array with M rows, N columns and K polarizations (K=2 in case of cross-polarization) as shown in FIG. 1.

A typical application of AAS is to perform DownLink Multi-User MIMO (DL MU-MIMO) which allows the frequency resources to be shared by multiple User Equipment (UEs) with co-scheduling transmissions at the same time. As a result, the co-scheduled UEs suffer from the co-channel interference, as can be seen in FIG. 2, which is one of the biggest challenges for DL MU-MIMO.

In order to achieve a good MU-MIMO performance, one of the approaches consists of having a codebook for the DL MU-MIMO, which tries to pair UEs with good spatial separation together. For example, the users that are co-scheduled with the same frequency resource should have good spatial separation from each other. Such a codebook may have a set of precoding matrices which are pre-defined. The optimum beam index or precoding matrix indicator (PMI) is reported by the UE with the Channel State information-Reference Signal (CSI-RS) report to the network node, such as an eNB/gNB. The optimum beam index can be also estimated at the eNB/gNB side by using UpLink (UL) reference signals (e.g. SRS or DMRS). At the eNB/gNB side, an UE pairing algorithm is used to find the UEs which are well separated from each other and thus can be co-scheduled together with minimized co-channel interference.

In 3GPP Release 13 (Rel-13), a two-dimensional (2D) Discrete Fourier Transform (DFT) codebook is proposed in [1][2] for non-precoded CSI-RS ("CLASS A"). The precoding matrix W is further described as a two-stage precoding structure as follows:

$$W = W_1 W_2$$

where the matrix $W_1$ consists of a group of 2D grid-of-beams (GoB) denoted as:

$$W_1 = \begin{bmatrix} w_h \otimes w_v & 0 \\ 0 & w_h \otimes w_v \end{bmatrix} \quad (1)$$

Where $w_h$ and $w_v$ are precoding matrices selected from an over-sampled DFT matrix for the horizontal direction and vertical direction, and they are expressed as:

$$w_v = \frac{1}{\sqrt{M}} \left[ 1, e^{\frac{j2\pi v}{MO_1}}, \ldots e^{\frac{j2\pi mv}{MO_1}}, \ldots e^{\frac{j2\pi (M-1)v}{MO_1}} \right]^T$$

$$w_h = \frac{1}{\sqrt{N}} \left[ 1, e^{\frac{j2\pi h}{NO_2}}, \ldots e^{\frac{j2\pi n h}{NO_2}}, \ldots e^{\frac{j2\pi (N-1)h}{NO_2}} \right]^T$$

Where $O_1$, $O_2$ are the over-sampling rates in the vertical and horizontal directions respectively, M refers to the number of rows of antenna elements and N refers to the number of columns of antenna elements in an AAS. For example, for a 2D AAS, as shown in FIG. 1, the horizontal direction refers to the antenna elements of each row, which form the beams in the direction parallel to the ground. The vertical direction refers to the antenna elements of each column, which form the beams in the direction vertical to the ground.

The matrix $W_2$ is used for beam selection within $W_1$ and co-phasing between two polarizations.

One of the problems of the DFT-based codebook for DL MU-MIMO is the strong sidelobe interference experienced by the co-scheduled UEs as shown in FIG. 3.

FIG. 3 shows the beam radiation pattern of a DFT-based precoding matrix (at index 0) with 8 Transmit (Tx) linear antenna array in a Line of Sight (LOS) channel model. It can be seen that there are multiple sidelobes leaked out of the main-lobe. These sidelobe leakages are dominant interference to other co-scheduled UEs located at around the sidelobe directions or positions, especially in Non-LOS (NLOS) scenario where there is an angle of spread of the multi-paths. Some sub-paths would unavoidably go through the sidelobe directions. In this case, the sidelobe interference could be the bottleneck of Signal to Interference plus Noise Ratio (SINR) for UEs who have a good Single User (SU)-MIMO channel quality. For instance, one UE, that is located at the direction of 20° from boresight (e.g. a direction that points to the middle of the cell) and has 30 dB SU-MIMO SINR, is able to achieve a peak throughput for a SU-MIMO transmission with 64QAM. Unfortunately, with MU-MIMO, the UE will suffer a 12.8 dB sidelobe interference from a co-scheduled UE in boresight. Then, the UE's effective SINR in MU-MIMO would be limited to 12.8 dB, which would make it impossible for the UE to reach the SU-MIMO peak throughput. As it can be seen, the MU-MIMO gain is degraded significantly by the sidelobe interference.

For DL MU-MIMO transmissions, the total transmit power is limited. The gain of MU-MIMO is mainly given by the UEs which have a good SINR, and the power can be split with other UEs. However, with the DFT codebook, the split power causes strong co-channel interference. Thus, the performance is limited by co-channel interference caused by strong sidelobe leakage. As such, the gain can be degraded significantly, or even become negative.

SUMMARY

According to one aspect, there is provided a method in a network node. The method comprises: obtaining a precoding matrix indicator (PMI) for a first codebook for use in a Single User Multiple Input Multiple Output (SU-MIMO) transmission; determining a precoding matrix for a second codebook, based on the obtained precoding matrix indicator; and selecting the determined precoding matrix for the second codebook in response to determining that an User Equipment (UE) is scheduled for a Multi-User (MU)-MIMO transmission.

In some embodiments, determining the precoding matrix for the second codebook may comprise applying a reshaping matrix to a precoding matrix that corresponds to the obtained PMI in the first codebook.

In some embodiments, the second codebook can be generated based on the first codebook by using a reshaping matrix.

In some embodiments, the reshaping matrix can comprise a matrix formed with precoding matrices from the first codebook, to which nulling precoding weights are applied, so that sidelobe leakage in the peak directions of the sidelobes of the precoding matrices are nulled.

In some embodiments, the reshaping matrix may comprise a matrix formed by applying a tapered window to the first codebook.

In some embodiments, the tapered window is generated using one of a Chebyshev window and Taylor window.

In some embodiments, the second codebook may have a one to one mapping with the first codebook.

In some embodiments, the second codebook may have a lower sidelobe leakage compared to sidelobe leakage of the first codebook in selected sidelobe directions.

In some embodiments, a two-dimension (2D) codebook may be generated based on the second codebook. For example, the 2D codebook may comprise precoding matrices for a horizontal direction selected from the second codebook and precoding matrices for a vertical direction selected from the second codebook.

In some embodiments, the 2D codebook may be generated based on the second codebook and the first codebook. For example, the 2D codebook may comprise precoding matrices for a horizontal direction selected from the second codebook and precoding matrices for a vertical direction selected from the first codebook. As another example, the 2D codebook may comprise precoding matrices for a horizontal direction selected from the first codebook and precoding matrices for a vertical direction selected from the second codebook.

According to another aspect, there is provided a network node, comprising a network interface and a processing circuitry connected thereto. The processing circuitry is configured to: obtain a precoding matrix indicator (PMI) for a first codebook for use in a Single User Multiple Input Multiple Output (SU-MIMO) transmission; determine a precoding matrix for a second codebook, based on the obtained precoding matrix indicator; and select the determined precoding matrix for the second codebook in response to determining that an User Equipment (UE) is scheduled for a Multi-User (MU)-MIMO transmission. The processing circuitry may comprise a processor and a memory connected thereto, the memory containing instructions that, when executed, cause the processor to perform the method and the embodiments as described above with respect to the first aspect.

Some embodiments of this disclosure may minimize the co-channel interference from co-scheduled UEs for codebook-based DL MU-MIMO systems. For example, a new codebook is generated, which is calculated with indexes aligned with the regular DFT codebook for SU-MIMO. The new codebook is easier to be implemented and integrated with SU-MIMO systems.

The proposed new codebook has a wider window of angle with near-to-zero sidelobe leakage to handle the multipath angle spread, which allows the codebook-based DL MU-MIMO to be feasible in NLOS scenarios.

The proposed new codebook can also be used by the eNB/gNB for CSI-RS precoding, sector virtualization and cell shaping to further minimize the inter-beam, inter-sector and inter-cell interference.

The new codebook can be also used by the UE for CSI estimation.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

In the specification, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

Figure 4:
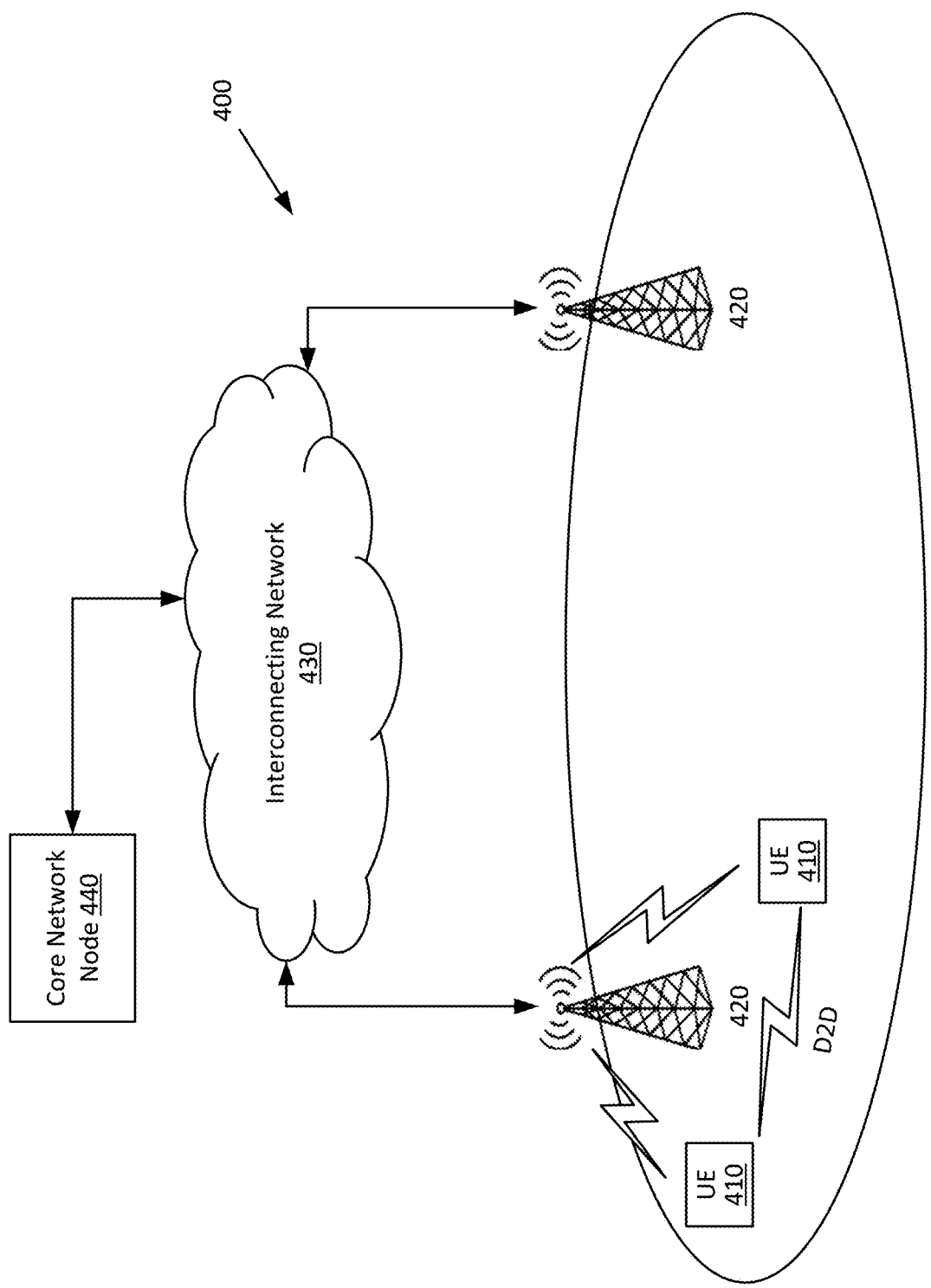
FIG. 4 is a schematic diagram of a communication network, according to an embodiment.

FIG. 4 illustrates an example of a wireless network or communication network 400 that may be used for wireless communications. Wireless network 400 includes wireless devices 410 and a plurality of radio access nodes or network nodes 420 (e.g., eNBs, gNBs, etc.) connected to one or more core network nodes 440 via an interconnecting network 430. The network 400 may use any suitable deployment scenarios, such as a non-centralized, co-sited, centralized, or shared deployment scenario. Wireless devices 410 within a coverage area may each be capable of communicating directly with radio access nodes 420 over a wireless interface. In certain embodiments, wireless devices 410 may also be capable of communicating with each other via device-to-device (D2D) communication. In certain embodiments, radio access nodes 420 may also be capable of communicating with each other, e.g. via an interface (e.g. X2 in LTE or other suitable interface).

As an example, wireless device 410 may communicate with radio access node 420 over a wireless interface. That is, wireless device 410 may transmit wireless signals and/or receive wireless signals from radio access node 420. The wireless signals may contain voice traffic, data traffic, control signals, and/or any other suitable information. In some embodiments, an area of wireless signal coverage associated with a radio access node 420 may be referred to as a cell.

In some embodiments, wireless device 410 may be interchangeably referred to by the non-limiting term user equipment (UE). Wireless device 410 can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. Example embodiments of a wireless device 410 are described in more detail below with respect to FIG. 9. The wireless device 410 may have multiple antennas, for example.

In some embodiments, the generic terminology "network node" is used. A "network node" refers to equipment capable, configured, arranged and/or operable to communicate directly or indirectly with a wireless device and/or with other equipment in the wireless communication network that enable and/or provide wireless access to the wireless device. As such, it can be any kind of network node which may comprise a radio network node such as radio access node 420 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment. For example, a network node may have multiple antennas.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

The term radio access technology (RAT) may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" may be used to denote a UE (e.g., wireless device 410) or a radio network node (e.g., radio access node 420). A radio node may also be in some cases interchangeably called a transmission point (TP) or transmission reception point (TRP).

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

The term "radio signal" may also be interchangeably used with the term radio channel and may comprise physical or logical channel Example signals/channels: reference signal, synchronization signal, broadcast channel, paging channel, control channel, data cannel, shared channel, etc.

In certain embodiments, radio access nodes 420 may interface with a radio network controller. The radio network controller may control radio access nodes 420 and may provide certain radio resource management functions, mobility management functions, and/or other suitable functions. In certain embodiments, the functions of the radio network controller may be included in radio access node 420. The radio network controller may interface with a core network node 440. In certain embodiments, the radio network controller may interface with the core network node 440 via an interconnecting network 430.

The interconnecting network 430 may refer to any interconnecting system capable of transmitting audio, video, signals, data, messages, or any combination of the preceding. The interconnecting network 430 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 440 may manage the establishment of communication sessions and various other functionalities for wireless devices 410. Examples of core network node 440 may include MSC, MME, SGW, PGW, O&M, OSS, SON, positioning node (e.g. E-SMLC), MDT node, etc. Wireless devices 410 may exchange certain signals with the core network node using the non-access stratum layer. In non-access stratum signaling, signals between wireless devices 410 and the core network node 440 may be transparently passed through the radio access network. In certain embodiments, radio access nodes 420 may interface with one or more network nodes over an internode interface. For example, radio access nodes 420 may interface over an X2 interface with each other.

Although FIG. 4 illustrates a particular arrangement of network 400, the present disclosure contemplates that the various embodiments described herein may be applied to a variety of networks having any suitable configuration. For example, network 400 may include any suitable number of wireless devices 410 and radio access nodes 420, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments are applicable to any RAT, such as UTRA, E-UTRA, narrow band internet of things (NB-IoT), WiFi, Bluetooth, next generation RAT (NR, NX), 4G, 5G, LTE FDD/TDD, WCDMA/HSPA, GSM/GERAN, WLAN, CDMA2000, etc.

It should be understood that an actual implementation of network 400 may include multiple network nodes 420 and UEs 410, and may include elements not illustrated herein. Moreover, it should be understood that different communication standards adopt somewhat different architectures and/or use different nomenclature. Unless otherwise noted, then, the depiction of a particular network architecture, or the use of standards-related nomenclature should not be construed as limiting communications control as taught herein.

As mentioned above, the current DFT codebook is not adequate for MU-MIMO transmissions. For a good MU-MIMO performance, the users that are co-scheduled with the same frequency resource should have good spatial separation from each other. In addition, the precoding matrices should have sidelobes as small as possible in order to reduce the co-channel interference.

Embodiments of the present disclosure provide methods for codebook generation and selection for performing a MU-MIMO transmission. For example, the generation of the new codebook is based on a first codebook (e.g. DFT), using a reshaping matrix. The generated codebook has a one to one mapping with the first codebook and has reduced sidelobe leakage compared to the first codebook.

The First Codebook

One example of the first codebook can be an over-sampled DFT matrix. For a generic one dimension (1D) antenna array with a number of antenna elements N and an over-sampling rate O (O=2, 4, . . . ), in total, there can be B (B=NO) precoding matrices (beams). Then, the k-th precoding matrix in the first codebook ($w_k^{(1)} \in B_1$) is denoted by:

$$w_k^{(1)} = \frac{1}{\sqrt{N}}\left[1, e^{\frac{j2\pi k}{B}}, \ldots, e^{\frac{j2\pi n k}{B}}, \ldots, e^{\frac{j2\pi(N-1)k}{B}}\right]^T, \quad (1)$$
$$k = 0, 1, \ldots, B-1$$

wherein $B_1$ corresponds to the first codebook.

Generating the Second Codebook

A generic way of generating the second codebook with reduced sidelobe leakage is to reshape the first codebook (e.g. DFT matrix above) by applying a reshaping matrix to every precoding matrix of the first codebook, as follows:

$$w_k^{(2)} = R_k w_k^{(1)}, k=0,1,\ldots,B-1 \quad (2)$$

Where $w_k^{(2)} \in B_2$ refers to the k-th precoding matrix in the corresponding second codebook; $R_k$ is a reshaping matrix per precoding matrix and $B_2$ corresponds to the second codebook.

Alternatively, if a single reshaping matrix is applied to all the precoding matrices of the first codebook, the second codebook can be generated and is denoted as follows:

$$B_2 = RB_1 \quad (3)$$

Where R is the reshaping matrix per codebook.

It can be seen, from equations (2) and (3), that the first and second codebooks have a one to one mapping. The selection of the reshaping matrix should allow the precoding matrices in the second codebook to have the same main lobe direction as the direction of the corresponding precoding matrices in the first codebook. However, the main lobe width (e.g. 3 dB width) can be different between the precoding matrices from the first and second codebooks. The generated second codebook should have sidelobe leakage lower than the sidelobe leakage of the first codebook.

Now, examples of different reshaping matrices will be described.

Sidelobe Nulling Reshaping

Figure 1:
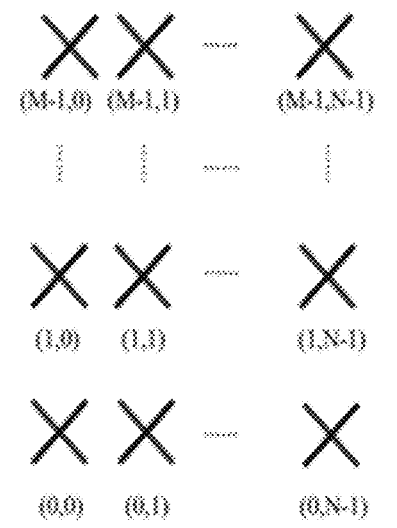
FIG. 1 illustrates a schematic diagram of a two-dimension antenna element array.
Figure 2:
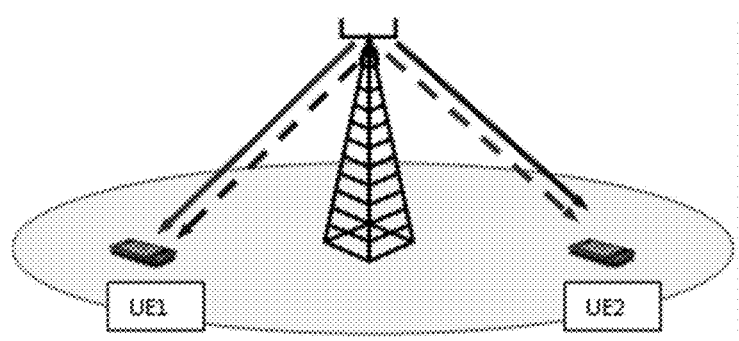
FIG. 2 is a schematic diagram of an example of co-channel interference in DL MU-MIMO transmissions between UEs.
Figure 3:
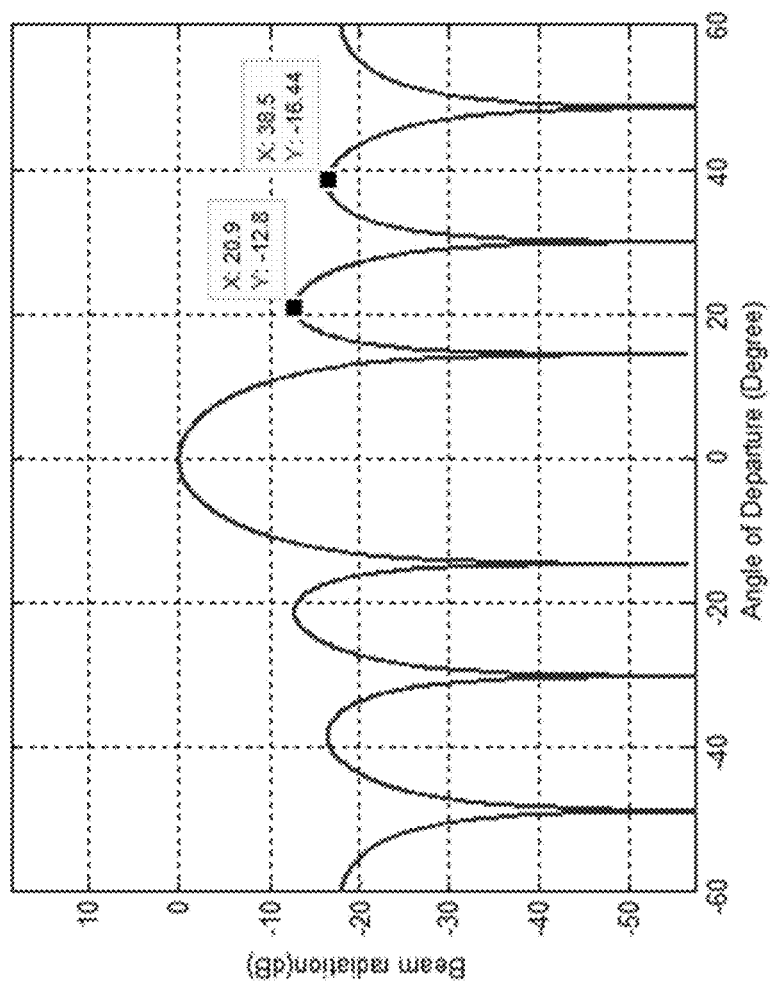
FIG. 3 illustrates an example of sidelobe interference of a DFT codebook.

One exemplary method of generating the second codebook with reduced sidelobe leakage is to null or cancel the leakage/interference in the sidelobe directions of the regular DFT precoding matrices. For instance, in FIG. 3, the radiation pattern of a 8Tx DFT precoding matrix (at index 0) shows that there are in total 6 sidelobes on the two sides of the main-lobe. Therefore, the direction of each sidelobe peak can be determined by looking at the radiation pattern as illustrated in FIG. 3. The directions corresponding to the sidelobe peaks or any points/positions close to the peaks can be selected as the nulling directions of the new precoding matrices of the second codebook.

The corresponding new precoding matrix should have the same main-lobe direction as the precoding matrix of the first codebook. Also, the new precoding matrix has reduced leakage in the selected sidelobe directions compared to the precoding matrix of the first codebook. The new (or second) codebook can be thus generated by forming a nulling in the sidelobe directions using the zero-forcing principle. It should be appreciated by a person skilled in the art that other principles may be used as well to null the sidelobe directions.

For each DFT precoding matrix $w_k^{(1)}$ (k=0, 1, . . . , B−1) in first codebook, the corresponding new precoding matrix with reduced sidelobe leakage can be generated with the following steps.

First, determine the sidelobe directions of the DFT precoding matrix $w_k^{(1)}$. For an over-sampled DFT codebook, the precoding matrix indexes $k_m$ at the sidelobe directions can be determined by:

$$k_m = (O*m+k+O/2)\% \ B, m=1, \ldots, N-2 \quad (4)$$

An example of $k_m$ values with N=8, O=2 is given in Table 1.

TABLE 1

Sidelobe precoding matrix indexes $k_m$ with N = 8, O = 2

| k | m = 1 | m = 2 | m = 3 | m = 4 | m = 5 | m = 6 |
|---|---|---|---|---|---|---|
| 0 | 3 | 5 | 7 | 9 | 11 | 13 |
| 1 | 4 | 6 | 8 | 10 | 12 | 14 |
| 2 | 5 | 7 | 9 | 11 | 13 | 15 |
| 3 | 6 | 8 | 10 | 12 | 14 | 0 |
| 4 | 7 | 9 | 11 | 13 | 15 | 1 |
| 5 | 8 | 10 | 12 | 14 | 0 | 2 |
| 6 | 9 | 11 | 13 | 15 | 1 | 3 |
| 7 | 10 | 12 | 14 | 0 | 2 | 4 |
| 8 | 11 | 13 | 15 | 1 | 3 | 5 |
| 9 | 12 | 14 | 0 | 2 | 4 | 6 |
| 10 | 13 | 15 | 1 | 3 | 5 | 7 |
| 11 | 14 | 0 | 2 | 4 | 6 | 8 |
| 12 | 15 | 1 | 3 | 5 | 7 | 9 |
| 13 | 0 | 2 | 4 | 6 | 8 | 10 |
| 14 | 1 | 3 | 5 | 7 | 9 | 11 |
| 15 | 2 | 4 | 6 | 8 | 10 | 12 |

Second, select the sidelobe directions to be nulled. For example, these directions can correspond to the sidelobe peaks or points close to the sidelobe peaks. Then, form a channel matrix with the precoding matrices corresponding to the directions to be nulled. The channel matrix can be expressed as:

$$H_k = [W_{k_1}, \ldots, W_{k'}, \ldots, w_{k_m}]^* m \in [1,2, \ldots, N-2] \quad (5)$$

where [ ]* denotes the conjugate of a matrix.

Third, calculate the nulling precoding weight with the zero-forcing principle as follows:

$$w_k^{(2)} = \{I - H_k(H_k^H H_k)^{-1} H_k^H\} w_k^{(1)} \quad (6)$$

where, I is an identity matrix with size of N×N. It should be noted that the zero-forcing technique is just an example for nulling/cancelling the leakage. Other techniques can be used as will be appreciated by a person skilled in the art.

Finally, perform a power normalization and back-off with $w_k^{(2)}$ as the following to normalize the total power per layer and secure the maximum power per antenna:

$$w_k^{(2)} = \propto \{I - H_k(H_k^H H_k)^{-1} H_k^H\} W_k^{(1)}$$

Thus, the new precoding matrix with reduced sidelobe leakage is generated. The final precoding matrix of the second codebook can be expressed as:

$$w_k^{(2)} = R_k w_k^{(1)}$$

Where $R_k = \propto \{I - H_k(H_k^H H_k)^{-1} H_k^H\}$ is the reshaping matrix, with $\propto$ being a factor for power normalization and back-off Tapered Window Reshaping Another method of generating the second codebook with reduced sidelobe leakage is to reshape the first codebook by applying a tapered window to every precoding matrix in the first codebook, this can be expressed as:

$$B_2 = RB_1 \quad (7)$$

Where, $$R = \begin{bmatrix} r(0) & \ldots & 0 \\ \vdots & r(n) & \vdots \\ 0 & \ldots & r(N-1) \end{bmatrix}$$

and r(n) is the n-th coefficient of a tapered window generated, for instance, with a Chebyshev window [3] or a Taylor window [4].

It should be noted that other methods for generating a tapered window can be considered by a person skilled in the art.

Generating the Two-Dimensional Second Codebook

The second codebook per dimension as described above can be used to generate the two-dimensional (2D) second codebook in a way similar as in equation (1) for the 2D AAS. The 2D second codebook is given by:

$$W_1^{(2)} = \begin{bmatrix} w_h^{(2)} \otimes w_v^{(2)} & 0 \\ 0 & w_h^{(2)} \otimes w_v^{(2)} \end{bmatrix} \quad (8)$$

Where $w_h^{(2)}$ and $w_v^{(2)}$ are the precoding matrices for the horizontal and vertical directions selected from the second codebook, respectively.

The 2D second codebook can also be generated based on the first codebook and the second codebook in a mixed manner. For instance, the second codebook is used in the horizontal direction and the first codebook is used in the vertical direction as shown below:

$$W_1^{(2)} = \begin{bmatrix} w_h^{(2)} \otimes w_v^{(1)} & 0 \\ 0 & w_h^{(2)} \otimes w_v^{(1)} \end{bmatrix} \quad (9)$$

Where $w_v^{(1)}$ are the precoding matrices for the vertical direction and selected from the first codebook and $w_h^{(2)}$ are the precoding matrices for the horizontal direction and selected from the second codebook.

It should be noted that a precoding matrix consists of one precoding vector or several precoding vectors. Also, the precoding matrices may refer to beamforming weights used by the network node (such as an gNB, eNB or base station) to transmit data to a wireless device.

It should be noted that the one-dimension codebook comprises precoding matrices for a 1D antenna and the 2D codebook comprises precoding matrices for a 2D antenna.

Radiation Patterns

Figure 5:
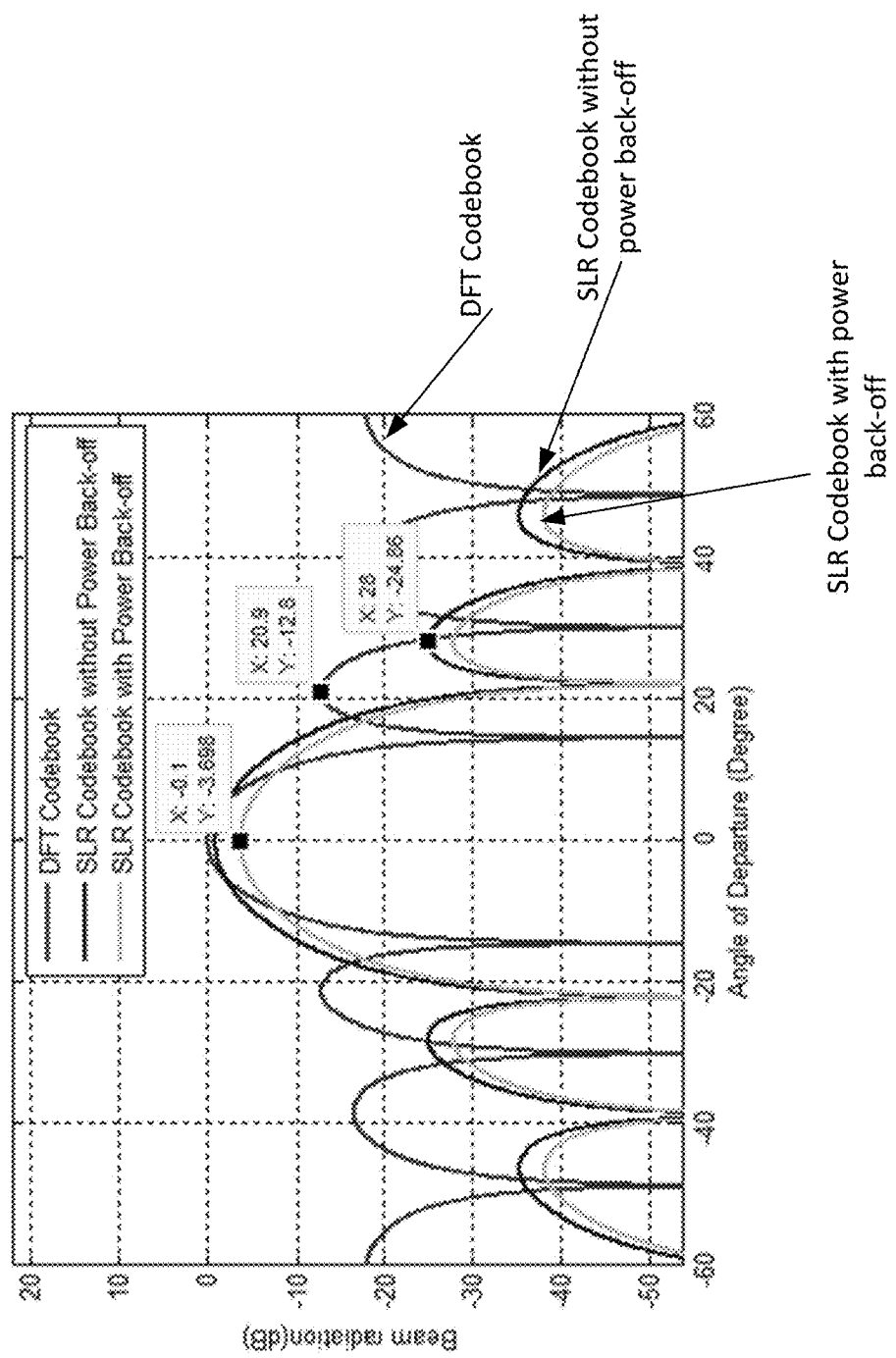
FIG. 5 illustrates an example of a radiation pattern of a codebook with reduced sidelobe leakage with 8 Transmit antennas, according to an embodiment.
Figure 6:
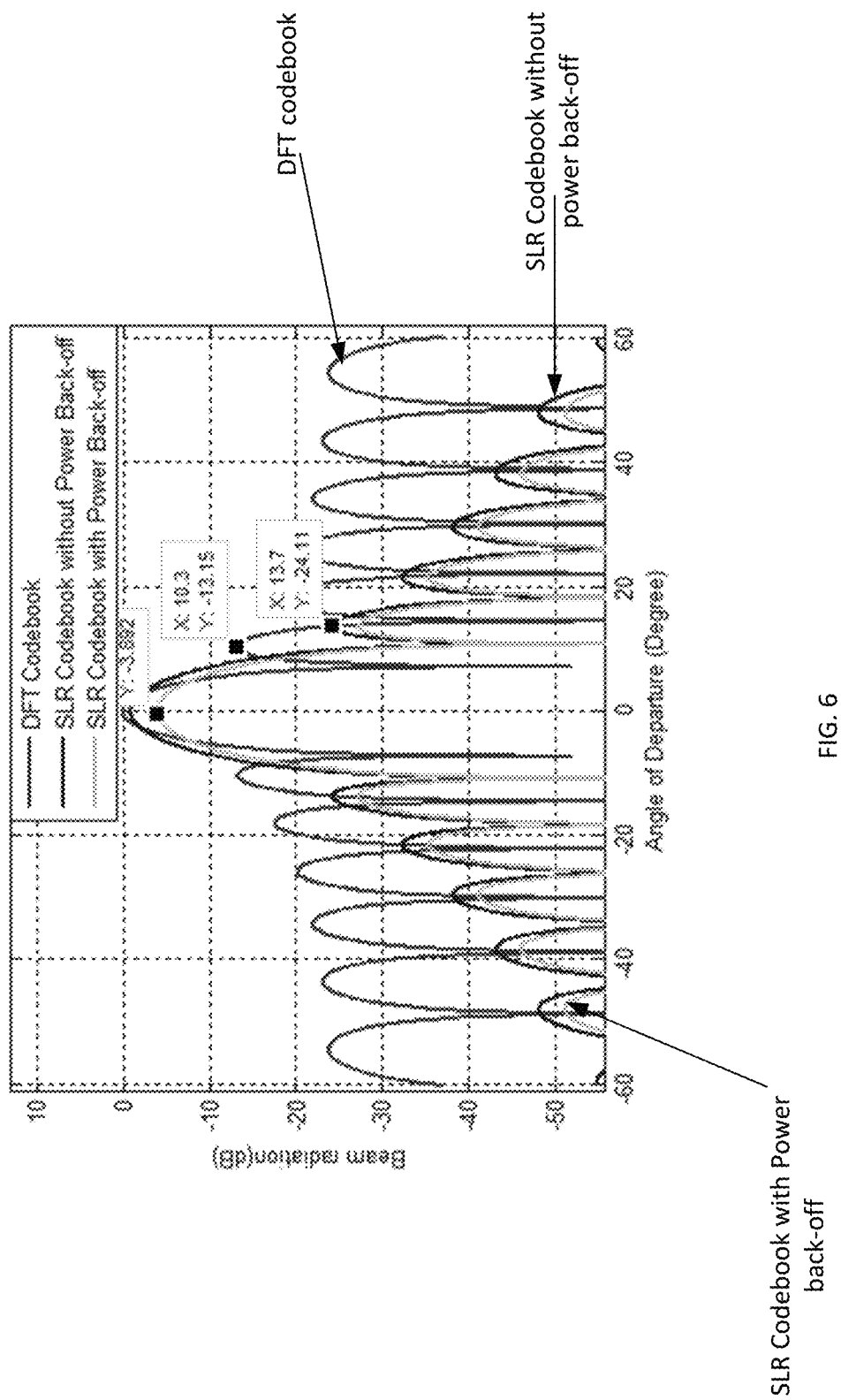
FIG. 6 illustrates an example of a radiation pattern of a codebook with reduced sidelobe leakage with 16 Transmit antennas, according to an embodiment.

FIGS. 5 and 6 show some radiation patterns of the second codebook, generated with sidelobe nulling based reshaping, referred to as the sidelobe leakage reduced (SLR) codebook, in comparison to the radiation patterns of the first codebook, referred to as the DFT codebook.

More specifically, FIGS. 5 and 6 illustrate the radiation patterns of a SLR codebook for a linear antenna array with 8Tx and 16Tx and with all the sidelobes selected (i.e. sidelobe interference nulled) for generating the SLR codebook. The radiation patterns of the SLR codebook are also shown in comparison with the radiation patterns of the regular DFT codebook. Also, the radiation patterns are plotted with the assumption that the channel is LOS, and the gain per antenna element is flat.

From FIGS. 5 and 6, it can be seen that the SLR codebook has much lower sidelobe leakage compared to the regular DFT codebook. The first sidelobe leakage of the regular DFT codebook is about −12.8 dB, which would make it impossible for the UEs to reach a peak throughput per UE. With the SLR codebook, the sidelobe leakage is reduced to −24.8 dB, which is low enough for the UEs to achieve a per UE peak throughput with 64QAM. Furthermore, the range of near-to-zero sidelobe interference is wide enough to cover the angle of spread of multi-path in NLOS scenarios. The overall sidelobe leakage can be further reduced with an increase of antenna elements, which means that more gain can be achieved for MU-MIMO transmissions by using the SLR codebook.

It can be also observed that with the SLR codebook and full sidelobe interference nulling, there is about 3.7~3.9 dB power back-off to ensure that the maximum power per antenna element is not exceeded, in case there is per antenna power limitation. Furthermore, the main-lobe is expanded a little bit wider compared with the regular DFT codebook. For instance, in FIG. 6 with 16Tx, the −20 dB beam width is expanded from 6.5° to 8.7°.

Adaptive Codebook Selection

As indicated above and illustrated in FIGS. 5 and 6, there can be seen that about 3.7~3.9 dB power is lost if the SLR codebook is used in a SU-MIMO transmission due to the applied power back-off. So, precoding with the SLR codebook is not good for SU-MIMO transmissions. Whether a UE is scheduled for a SU-MIMO or MU-MIMO transmission is decided by the eNB/gNB per TTI scheduling, and can be dynamically changed. As such, an adaptive codebook selection at the eNB/gNB side is needed. For example, when the first codebook is used by the UE to select and report the PMI, the eNB/gNB uses the reported PMI to generate a precoding matrix belonging to the second codebook. If the UE is scheduled for a SU-MIMO transmission, the precoding matrix corresponding to the reported PMI from the first codebook is selected. If the UE is scheduled for a MU-MIMO transmission, the precoding matrix generated based on the reported PMI and belonging to the second codebook is selected.

With an adaptive codebook selection at the eNB/gNB side, higher MU-MIMO gain can be achieved without performance degradation for a SU-MIMO transmission.

Figure 7:
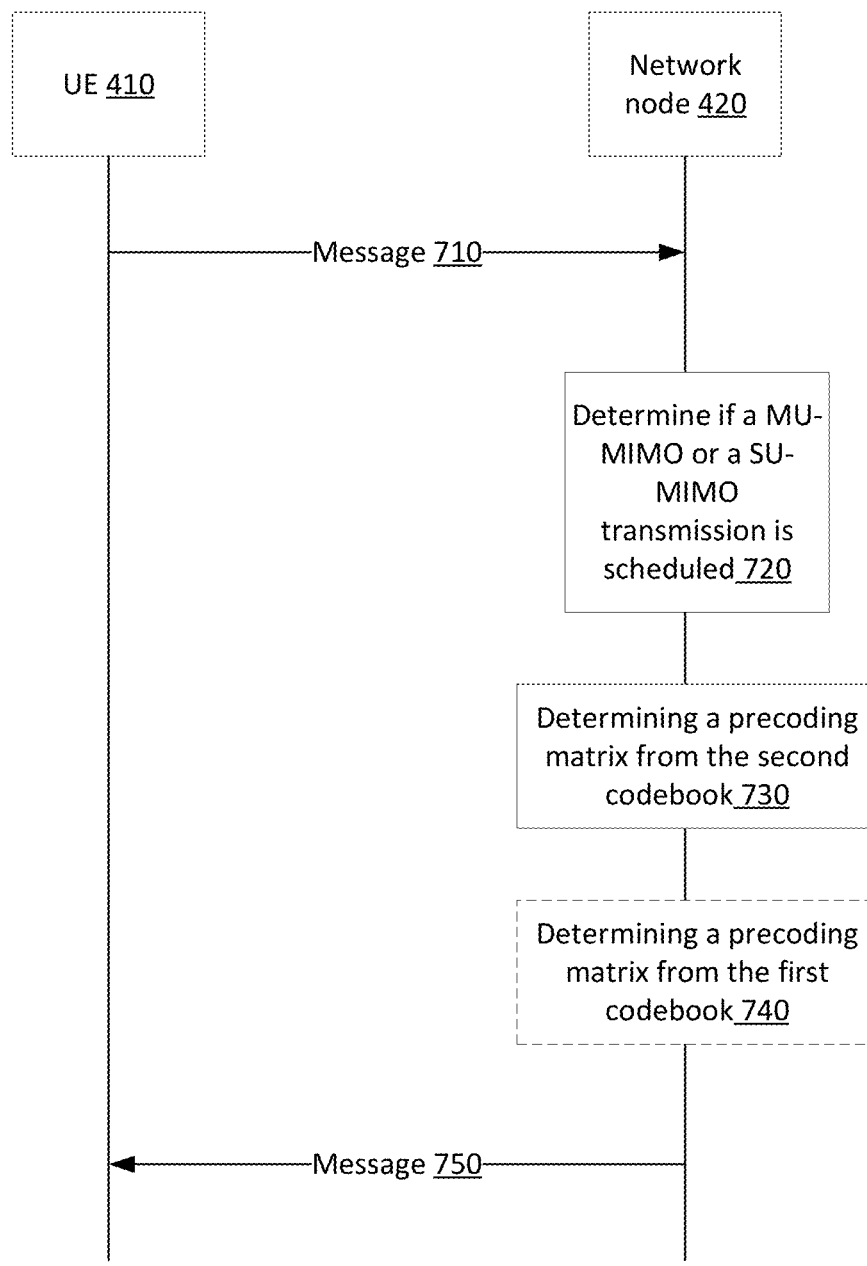
FIG. 7 illustrates a signaling diagram between a UE and a network node, according to an embodiment.

Now turning to FIG. 7, a signaling diagram between a UE and a network node will be described. The UE can be one of the UEs 410, the network node can be the network node 420 of FIG. 4. The communication between the UE 410 and the network node 420 can be exchanged over the communication network 400, for example.

The UE 410 may be configured with a first codebook, i.e. the regular DFT codebook, for example. The network node 420 may be configured with the first codebook (DFT codebook) and generates a second codebook (e.g., the SLR codebook) based on the first codebook, according to the embodiments as described above.

The UE 410 may determine a precoding matrix indicator (PMI) or an index in the first codebook. The precoding matrix indicator or the index may be determined based on channel quality for a SU-MIMO transmission and other parameters, that are well-known to a person skilled in the art.

The UE 410 then sends the determined index or PMI (that includes the index) to the network node 420, in a message (step 710). The message can be a CSI report, for example.

The network node 420 may determine if a MU-MIMO transmission is scheduled or a SU-MIMO transmission is scheduled (step 720).

Upon determining that a MU-MIMO transmission is scheduled, the network node 420 determines a precoding matrix from the second codebook based on the received PMI (step 730). To do so, the network node 420 uses the received PMI or index to obtain the corresponding precoding matrix in the second codebook, which was generated based one the first codebook, as described above. Alternatively, if the second codebook is not generated in advance, the network node can generate the precoding matrix from the second codebook based on the precoding matrix in the first codebook, that corresponds to the PMI. To do so, the network node can use equations (4) to (7) for example.

Upon determining that a SU-MIMO transmission is scheduled, the network node selects the precoding matrix corresponding to the PMI or index from the first codebook (step 740).

In step 750, the network node 420 can transmit data to the UE 410, using the determined precoding matrix (e.g. beamforming weights) based on the type of transmission (SU-MIMO or MU-MIMO).

It should be noted that in an alternative embodiment, for example, in a Time Division Duplex (TDD) mode, the network node 420 can estimate a PMI, based on uplink reference signals, for example. In this case, it does not need to receive any PMI or index from the UE 410.

Figure 8:
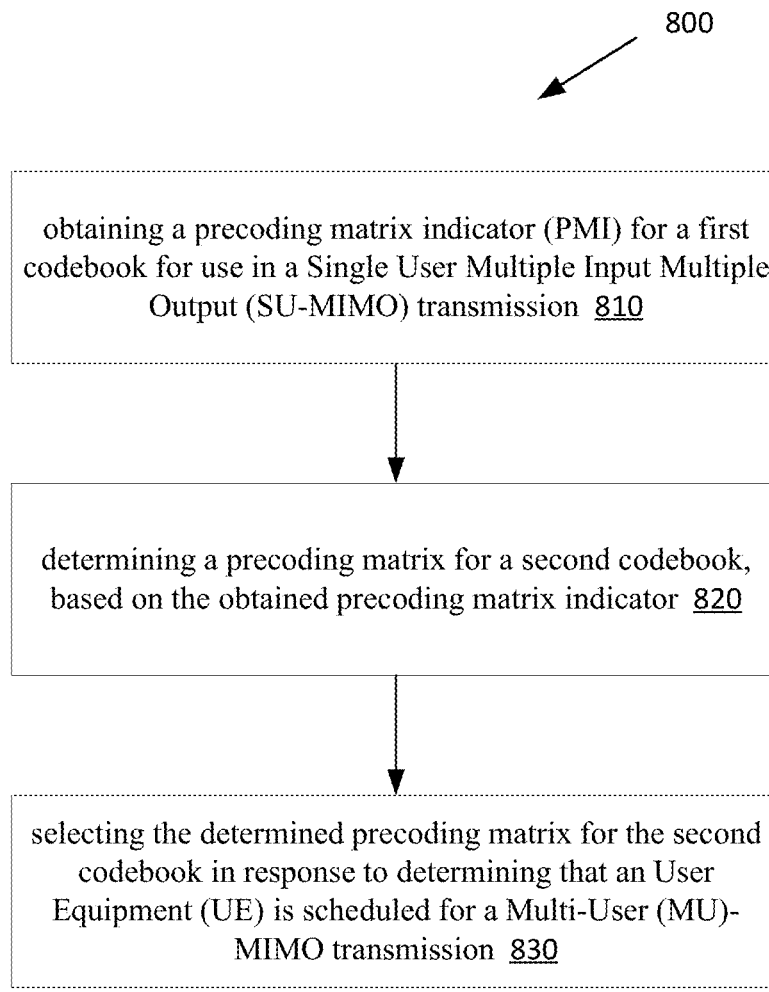
FIG. 8 is a flow chart of a method in a network node, in accordance with some embodiments.

FIG. 8 illustrates a flow chart for a method 800 of performing MU-MIMO transmissions in a communication network 400, for example. The method can be performed in a network node 420 which has multiple antennas or an AAS.

Method 800 includes:

Block 810: Obtaining a precoding matrix indicator (PMI) for a first codebook for use in a Single User Multiple Input Multiple Output (SU-MIMO) transmission;

Block 820: Determining a precoding matrix for a second codebook, based on the obtained precoding matrix indicator; and Block 830: Selecting the determined precoding matrix for the second codebook in response to determining that an User Equipment (UE) is scheduled for a Multi-User (MU)-MIMO transmission.

In some embodiments, the PMI can be obtained by receiving a report or a message from the wireless device. The report can be a CSI-RS report, which includes a PMI, for example. In other embodiments, the PMI can be estimated by the network node 420, based on uplink reference signals, for example.

In some embodiments, the method 800 may further comprise selecting a precoding matrix, corresponding to the obtained PMI, from the first codebook in response to determining that the UE is scheduled for a SU-MIMO transmission.

In some embodiments, the precoding matrix for the second codebook may be determined by applying a reshaping matrix to a precoding matrix that corresponds to the obtained PMI in the first codebook.

More generally, in some embodiments, the second codebook may be generated based on the first codebook by using a reshaping matrix.

In some embodiments, the reshaping matrix may be designed to suppress sidelobe leakage in peak directions of sidelobes of precoding matrices of the first codebook.

For example, the reshaping matrix may comprise a matrix formed with precoding matrices from the first codebook, to which nulling precoding weights are applied, so that sidelobe leakage in the peak directions of the sidelobes of the precoding matrices are nulled.

In other examples, the reshaping matrix may comprise a matrix formed by applying a tapered window to the first codebook. In some embodiments, the tapered window can be generated using a Chebyshev window or a Taylor window.

In some embodiments, the second codebook can have a one to one mapping with the first codebook.

In some embodiments, the second codebook can have a lower sidelobe leakage compared to sidelobe leakage of the first codebook in the selected sidelobe directions.

In some embodiments, method 800 further comprises generating a two-dimension (2D) codebook based on the second codebook.

For example, the 2D codebook can comprise precoding matrices for a horizontal direction selected from the second codebook and precoding matrices for a vertical direction selected from the second codebook. The 2D codebook, denoted as $W_1^{(2)}$ can be given by:

$$W_1^{(2)} = \begin{bmatrix} w_h^{(2)} \otimes w_v^{(2)} & 0 \\ 0 & w_h^{(2)} \otimes w_v^{(2)} \end{bmatrix}$$

where $w_h^{(2)}$ are the precoding matrices for the horizontal direction selected from the second codebook and $w_v^{(2)}$ are the precoding matrices for the vertical direction selected from the second codebook and $\otimes$ is a Kronecker product.

In some embodiments, the two-dimension (2D) codebook can be generated based on the second codebook and the first codebook.

For example, the 2D codebook can comprise precoding matrices for a horizontal direction selected from the second codebook and precoding matrices for a vertical direction selected from the first codebook.

Then, the 2D codebook, denoted as $W_1^{(2)}$ can be given by:

$$W_1^{(2)} = \begin{bmatrix} w_h^{(2)} \otimes w_v^{(1)} & 0 \\ 0 & w_h^{(2)} \otimes w_v^{(1)} \end{bmatrix}$$

where $w_h^{(2)}$ are the precoding matrices for the horizontal direction selected from the second codebook and $w_v^{(1)}$ are the precoding matrices for the vertical direction selected from the first codebook and $\otimes$ is a Kronecker product.

In other examples, the 2D codebook can comprise precoding matrices for a horizontal direction selected from the first codebook and precoding matrices for a vertical direction selected from the second codebook.

Then, the 2D codebook, denoted as $W_1^{(2)}$ can be given by:

$$W_1^{(2)} = \begin{bmatrix} w_h^{(1)} \otimes w_v^{(2)} & 0 \\ 0 & w_h^{(1)} \otimes w_v^{(2)} \end{bmatrix}$$

where $w_h^{(1)}$ are the precoding matrices for the horizontal direction selected from the first codebook and $w_v^{(2)}$ are the precoding matrices for the vertical direction selected from the second codebook.

It is understood that in some embodiments, the blocks of the flowcharts above may occur out of the order as shown in the figures. For example, two blocks shown in succession may, in fact, be executed substantially concurrently, or the blocks may sometimes be executed in the reverse order, depending upon the functionality involved.

Also, it should be noted that the generated second codebook can be made available to the wireless device or UE 410. In this case, when the UE determines an index/PMI to report to the network node, it can determine an index/PMI from the second codebook. In the network node side, if the network node 420 determines that a SU-MIMO transmission is scheduled, then the network node 420 can use the received index/PMI to get the corresponding beamforming weights from the first codebook. If the network node 420 determines that a MU-MIMO transmission is scheduled, then, it can use the received index/PMI to get the corresponding beamforming weights (precoding matrix) from the second codebook.

Some embodiments of a wireless device 410 will now be described with respect to FIG. 9. Even though the expression wireless device is used throughout the description, it is to be understood that the expression is used generically. In that sense, a wireless device (WD) generally refers to a device capable, configured, arranged and/or operable to communicate wirelessly with one or more network nodes (e.g., radio network nodes) and/or with one or more other wireless devices.

Figure 9:
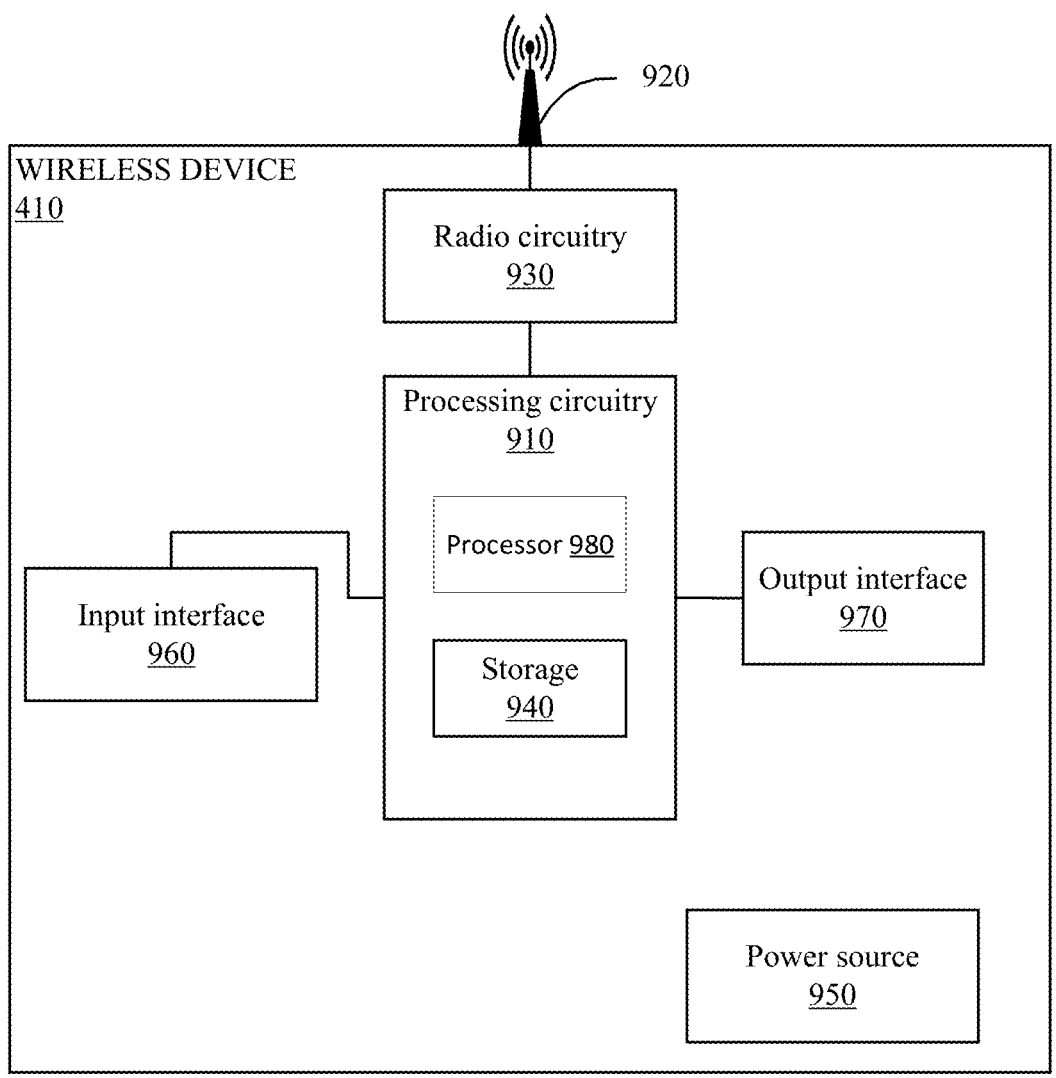
FIG. 9 is a block diagram of a wireless device in accordance with some embodiments.

FIG. 9 is a block diagram of an exemplary wireless device 410 in accordance with some embodiments. The wireless device 410 includes an antenna 920, radio front-end circuitry 930, processing circuitry 910, a computer-readable storage medium 940, an input interface 960 and output interface 970. Antenna 920 may include multiple antennas or antenna arrays, and is configured to send and/or receive wireless signals, and is connected to radio front-end circuitry 930. The radio front-end circuitry 930 may comprise various filters and amplifiers, is connected to antenna 920 and processing circuitry 910, and is configured to condition signals communicated between antenna 920 and processing circuitry 910. In certain alternative embodiments, UE 410 may not include radio front-end circuitry 930, and processing circuitry 910 may instead be connected to antenna 920 without radio front-end circuitry 930.

In some embodiments, the processing circuitry 910 may comprise a processor 980 and a memory such as the storage/memory 940, the processor 980 being connected to the input and output interfaces 960 and 970. The memory 940 contains instructions which, when executed by the processor, configure the processor to perform one or more functions described herein.

Processing circuitry 910 may comprise and/or be connected to and/or be adapted for accessing (e.g., writing to and/or reading from) memory 940. Such memory 940 may be configured to store code executable by control circuitry and/or other data, e.g., data pertaining to communication, e.g., configuration and/or address data of nodes, etc. Processing circuitry 910 may be configured to control any of the methods described herein and/or to cause such methods to be performed, e.g., by the processor. Corresponding instructions may be stored in the memory 940, which may be readable and/or readably connected to the processing circuitry 910.

Antenna 920, radio front-end circuitry 930, processing circuitry 910, and/or input interface 960 and output interface 970 may be configured to perform any transmitting operations described herein as being performed by a wireless device. Any information, data and/or signals may be transmitted to a network node and/or another wireless device. The input interface 960 and output interface 970 can be collectively referred to as a network interface, which is connected to the processor and/or memory.

Other embodiments of wireless device 410 may include additional components beyond those shown in FIG. 9 that may be responsible for providing certain aspects of the UE's functionalities, including any of the functionalities described above and/or any additional functionalities (including any functionality necessary to support the solution described above). As just one example, wireless device 410 may include input devices and circuits, output devices, and one or more synchronization units or circuits, which may be part of the processor. Input devices include mechanisms for entry of data into wireless device 410. For example, input devices may include input mechanisms, such as a microphone, input elements, a display, etc. Output devices may include mechanisms for outputting data in audio, video and/or hard copy format. For example, output devices may include a speaker, a display, etc.

Embodiments of a network node 420 will now be described with respect to FIGS. 10 and 11.

Figure 10:
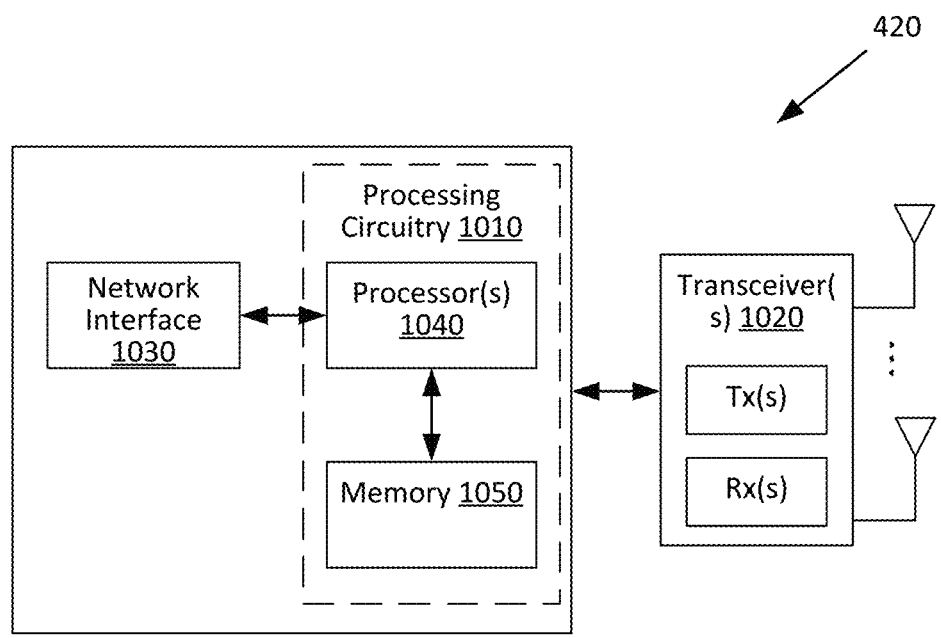
FIG. 10 is a block diagram of a network node in accordance with some embodiments.
Figure 11:
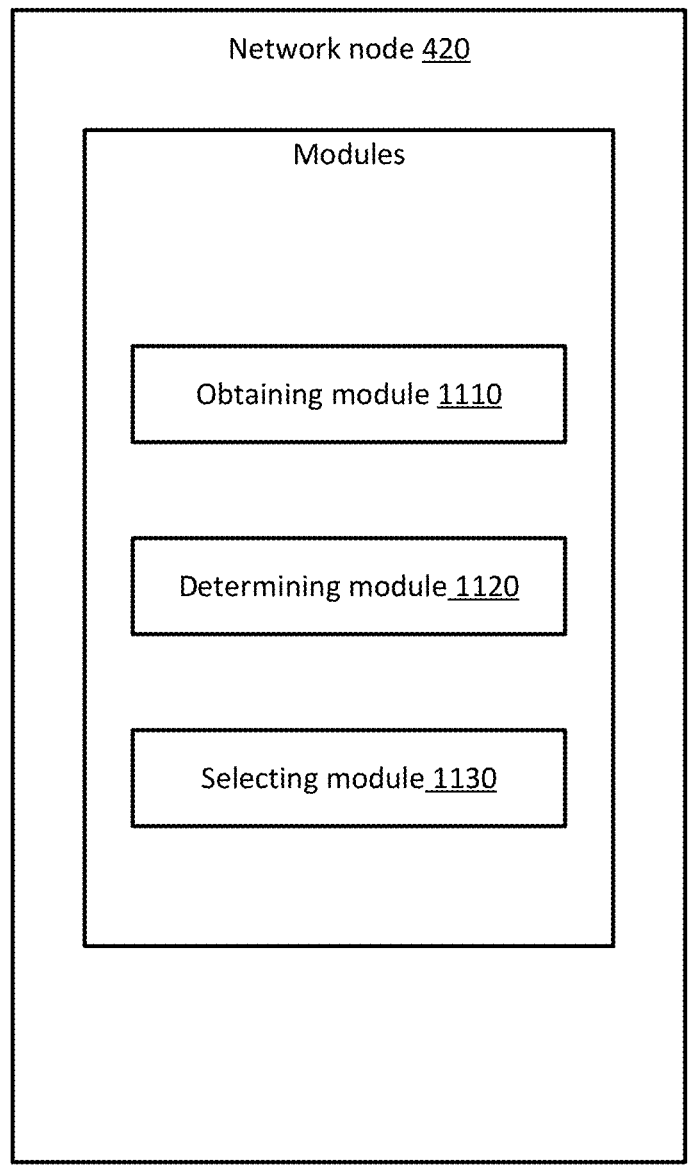
FIG. 11 is another block diagram of a network node in accordance with some embodiments.

FIG. 10 is a block diagram of a network node 420, such as a base station, an eNodeB or a gNB, configured to perform a MU-MIMO transmission according to some embodiments. The network node 420 has processing circuitry 1010 having a memory 1050 and a processor 1040. The network node 420 further comprises a network interface 1030 and one or more transceivers 1020. The transceivers may comprise multiple antennas or AAS. In some embodiments, the transceiver 1020 facilitates transmitting wireless signals to and receiving wireless signals from wireless device 410 (e.g., via an antenna), the one or more processors 1040 executes instructions to provide some or all of the functionalities described above (such as method 800) as being provided by the network node 420, the memory 1050 stores the instructions for execution by the one or more processors 1040, and the network interface 1030 communicates signals to backend network components, such as a gateway, switch, router, Internet, Public Switched Telephone Network (PSTN), core network nodes or radio network controllers, etc. The network interface 1030 is connected to the processor and/or memory.

As an example, the processor 1040 is configured to perform method 800. The one or more processors 1040 may include any suitable combination of hardware and software implemented in one or more modules to execute instructions and manipulate data to perform some or all of the described functions of the network node 420, such as method 800. In some embodiments, the one or more processors 1040 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 1040 may comprise one or more of the modules discussed below with respect to FIG. 11.

The memory 1050 is generally operable to store instructions, such as a computer program, software, an application including one or more of logic, rules, algorithms, code, tables, etc. and/or other instructions capable of being executed by one or more processors 1040. Examples of memory 1050 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of radio network node 420 may include additional components beyond those shown in FIG. 10 that may be responsible for providing certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 10 may be included in other network nodes (such as core network node 430). Other network nodes may optionally include or not include a wireless interface (such as the transceiver described in FIG. 10).

In some embodiments, the network node 420 may comprise a series of modules configured to implement the functionalities of the network node 420 described above. Referring to FIG. 11, in some embodiments, the network node 420 may comprise an obtaining module 1110, a determining module 1120 and a selecting module 1130. The obtaining module 1110 is configured to obtain a precoding matrix indicator (PMI) for a first codebook for use in a Single User Multiple Input Multiple Output (SU-MIMO) transmission. The determining module 1120 is configured to, determine a precoding matrix for a second codebook, based on the obtained precoding matrix indicator. The selecting module 1130 is configured to select the determined precoding matrix for the second codebook in response to determining that an User Equipment (UE) is scheduled for a Multi-User (MU)-MIMO transmission.

The network node 420 may further comprise a generating module for generating the second codebook based on the first codebook.

It will be appreciated that the various modules may be implemented as combination of hardware and/or software, for instance, the processor, memory and transceiver(s) of a network node 420 shown in FIG. 10. Some embodiments may also include additional modules to support additional and/or optional functionalities.

Embodiments may also be practiced in distributed computing environments where tasks are performed by remote-processing devices that are linked through a communications network.

Figure 12:
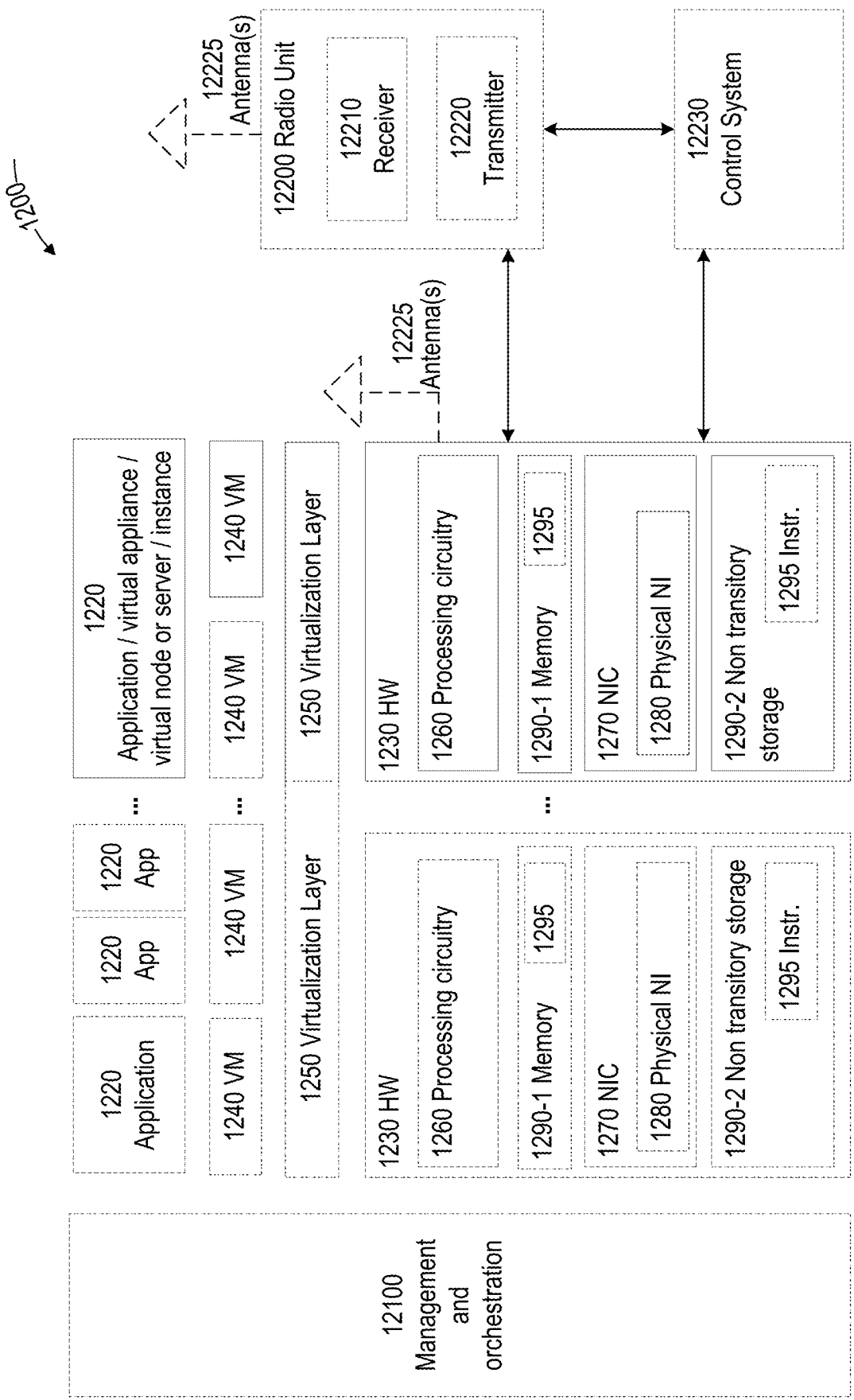
FIG. 12 is a virtualized environment for a network node, in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a network node 420 (e.g., a virtualized base station or a virtualized radio access node) or to a device 410 (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein, such as method 800, may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

In this example, functions and method 800 of the network node 420 described herein are implemented at the one or more processors 1040 can be distributed across virtualization environment 1200 in any desired manner. In some particular embodiments, some or all of the functions and method 800 of the network node 420 described herein are implemented as virtual components executed by one or more virtual machines 1240.

In some embodiments, a computer program including instructions which, when executed by at least one processor, causes the at least one processor to carry out the functionality of a network node 420 implementing one or more of the functions or method 800 of the network node in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

ABBREVIATIONS

The present description may comprise one or more of the following abbreviation:
AAS Active Antenna System
CSI-RS Channel State Information Reference Signal
DFT Discrete Fourier Transform
DMRS Demodulation Reference Signal
FD-MIMO Full Dimension MIMO
GoB Grid-of-beams
PMI Precoding Matrix Indicator
SRS Sounding Reference Signal
1×RTT CDMA2000 1×Radio Transmission Technology
3GPP 3rd Generation Partnership Project
5G 5th Generation
ABS Almost Blank Subframe
ARQ Automatic Repeat Request
BCCH Broadcast Control Channel
BCH Broadcast Channel
CA Carrier Aggregation
CC CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
ECGI Evolved CGI
eNB E-UTRAN NodeB
ePDCCH enhanced Physical Downlink Control Channel
E-UTRA Evolved UTRA
E-UTRAN Evolved UTRAN
FDD Frequency Division Duplex
GERAN GSM EDGE Radio Access Network
gNB Base station in NR (corresponding to eNB in LTE)
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MME Mobility Management Entity
MSC Mobile Switching Center
NPDCCH Narrowband Physical Downlink Control Channel
NR New Radio
OFDMA Orthogonal Frequency Division Multiple Access
OSS Operations Support System
PBCH Physical Broadcast Channel
P-CCPCH Primary Common Control Physical Channel
PCell Primary Cell
PDCCH Physical Downlink Control Channel
PDSCH Physical Downlink Shared Channel
PGW Packet Gateway
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
ACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SIB System Information Block
SNR Signal to Noise Ratio
TDD Time Division Duplex
TDOA Time Difference of Arrival
TOA Time of Arrival
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLANWide Local Area Network

REFERENCES

The following reference(s) may be related to the present description:
[1] Qualcomm, Two-Dimensional Discrete Fourier Transform (2D-DFT) based codebook for elevation beamforming, PCT/CN2013/007164
[2] 3GPP TS 36.213 V14.2.0
[3] https://www.mathworks.com/help/signal/ref/chebwin.html
[4] https://www.mathworks.com/help/signal/ref/taylor-win.html

What is claimed is:

1. A method in a network node, the method comprising:
obtaining a precoding matrix indicator (PMI) for a first codebook for use in a Single User Multiple Input Multiple Output (SU-MIMO) transmission;
determining a precoding matrix for a second codebook, based on the obtained precoding matrix indicator, wherein determining the precoding matrix for the second codebook comprises applying a reshaping matrix to a precoding matrix that corresponds to the obtained PMI in the first codebook; and
selecting the determined precoding matrix for the second codebook in response to determining that an User Equipment (UE) is scheduled for a Multi-User (MU)-MIMO transmission.

2. A network node, comprising a network interface and a processing circuitry connected thereto, the processing circuitry comprising a processor and a memory connected thereto, the memory containing instructions that, when executed, cause the processor to:
obtain a precoding matrix indicator (PMI) for a first codebook for use in a Single User Multiple Input Multiple Output (SU-MIMO) transmission;
determine a precoding matrix for a second codebook, based on the obtained precoding matrix indicator, wherein determining the precoding matrix for the second codebook comprises applying a reshaping matrix to a precoding matrix that corresponds to the obtained PMI in the first codebook; and
select the determined precoding matrix for the second codebook in response to determining that an User Equipment (UE) is scheduled for a Multi-User (MU)-MIMO transmission.

3. The network node of claim 2, wherein the processor is configured to select a precoding matrix, corresponding to the obtained PMI, from the first codebook in response to determining that the UE is scheduled for a SU-MIMO transmission.

4. The network node of claim 2, wherein the processor is configured to generate the second codebook based on the first codebook by using the reshaping matrix.

5. The network node of claim 2, wherein the processor is configured to form the reshaping matrix with precoding matrices from the first codebook, to which nulling precoding weights are applied, so that sidelobe leakage in peak directions of sidelobes of the precoding matrices from the first codebook are nulled.

6. The network node of any of claim 2, wherein the processor is configured to form the reshaping matrix by applying a tapered window to the first codebook.

7. The network node of claim 6, wherein the processor is configured to generate the tapered window using one of a Chebyshev window and Taylor window.

8. The network node of claim 2, wherein the second codebook has a one to one mapping with the first codebook.

9. The network node of claim 2, wherein the second codebook has a lower sidelobe leakage compared to sidelobe leakage of the first codebook in selected sidelobe directions.

10. The network node of claim 2, wherein the processor is configured to generate a two-dimension (2D) codebook based on the second codebook.

11. The network node of claim 10, wherein the 2D codebook comprises precoding matrices for a horizontal direction selected from the second codebook and precoding matrices for a vertical direction selected from the second codebook.

12. The network node of claim 11, wherein the 2D codebook, denoted as $W_1^{(2)}$ is given by:

$$W_1^{(2)} = \begin{bmatrix} w_h^{(2)} \otimes w_v^{(2)} & 0 \\ 0 & w_h^{(2)} \otimes w_v^{(2)} \end{bmatrix}$$

where $w_h^{(2)}$ are the precoding matrices for the horizontal direction selected from the second codebook and $w_v^{(2)}$ are the precoding matrices for the vertical direction selected from the second codebook and $\otimes$ is a Kronecker product.

13. The network node of claim 2, wherein the processor is configured to generate a two-dimension (2D) codebook based on the second codebook and the first codebook.

14. The network node of claim 13, wherein the 2D codebook comprises precoding matrices for a horizontal direction selected from the second codebook and precoding matrices for a vertical direction selected from the first codebook.

15. The network node of claim 14, wherein the 2D codebook, denoted as $W_1^{(2)}$ is given by:

$$W_1^{(2)} = \begin{bmatrix} w_h^{(2)} \otimes w_v^{(1)} & 0 \\ 0 & w_h^{(2)} \otimes w_v^{(1)} \end{bmatrix}$$

where $w_h^{(2)}$ are the precoding matrices for the horizontal direction selected from the second codebook and $w_v^{(1)}$ are the precoding matrices for the vertical direction selected from the first codebook and $\otimes$ is a Kronecker product.

16. The network node of claim 13, wherein the 2D codebook comprises precoding matrices for a horizontal direction selected from the first codebook and precoding matrices for a vertical direction selected from the second codebook.

17. The network node of claim 16, wherein the 2D codebook, denoted as $W_1^{(2)}$ is given by:

$$W_1^{(2)} = \begin{bmatrix} w_h^{(1)} \otimes w_v^{(2)} & 0 \\ 0 & w_h^{(1)} \otimes w_v^{(2)} \end{bmatrix}$$

where $w_h^{(2)}$ are the precoding matrices for the horizontal direction selected from the first codebook and $w_v^{(2)}$ are the precoding matrices for the vertical direction selected from the second codebook.

18. The network node of claim 2, wherein the processor is configured to receive from a wireless device a report comprising the precoding matrix indicator.

19. The network node of claim 2, wherein the processor is configured to estimate the PMI based on uplink reference signals.

* * * * *